United States Patent [19]

Leutner et al.

[11] Patent Number: 4,786,211

[45] Date of Patent: Nov. 22, 1988

[54] FILLING CAVITIES IN MINING

[75] Inventors: Bernd Leutner, Frankenthal; Berthold Mueller, Bensheim; Wilhelm Volkenborn, Marl, all of Fed. Rep. of Germany

[73] Assignee: BASF Aktiengesellschaft, Fed. Rep. of Germany

[21] Appl. No.: 82,732

[22] Filed: Aug. 6, 1987

[30] Foreign Application Priority Data

Aug. 29, 1986 [DE] Fed. Rep. of Germany ....... 3629477

[51] Int. Cl.$^4$ .......................... E02D 3/12; E21F 15/00
[52] U.S. Cl. ...................................... 405/264; 299/11; 405/267
[58] Field of Search ............... 405/258, 263, 264, 267; 166/293, 294; 299/11, 12

[56] References Cited

U.S. PATENT DOCUMENTS

| | | | |
|---|---|---|---|
| 2,801,983 | 8/1957 | Dixon et al. | 405/264 X |
| 2,995,457 | 8/1961 | Lyons et al. | 405/264 X |
| 3,503,215 | 3/1970 | Graf et al. | 405/264 |
| 4,136,998 | 1/1979 | Bassier et al. | 405/267 |

Primary Examiner—David H. Corbin
Attorney, Agent, or Firm—Keil & Weinkauf

[57] ABSTRACT

Cavities in mining are filled by introducing a mixture consisting of a slurry or sludge which evolves $CO_2$, foams and solidifies and predominantly comprises alpha-hemihydrate, alpha-$CaSO_4 \cdot 0.5\ H_2O$, an alkali metal or alkaline earth metal carbonate and water, by a method in which the mixture is mixed with a bisulfate-containing aqueous solution or suspension of one or more metals before being introduced into the cavities to be filled.

7 Claims, No Drawings

FILLING CAVITIES IN MINING

The present invention relates to a process for filling cavities in mining by introducing a mixture consisting of a slurry or sludge which evolves $CO_2$, foams and solidifies and predominantly comprises alpha-hemihydrate, alpha-$CaSO_4.0.5\ H_2O$, an alkali metal carbonate or an alkaline earth metal carbonate and water.

Various methods are used for filling cavities in mining, in particular cavities between the rock and the facing in gallery or tunnel construction. For example, the cavities produced by mining can be filled by introducing loose rocks. However, this always leaves a certain proportion of cavities between the rocks, which may amount to as much as about 30%, so that the flow of pit gas into the gallery cannot be excluded with absolute certainty. Another method is to introduce phenol/formaldehyde foams. However, this method is unsuitable where the strength has to meet certain requirements. Moreover, the use of organic foams makes it necessary to take special measures with regard to fire safety.

Where the strength of the filling material has to meet certain requirements, compounds which set with water, in the form of sludges or slurries, are generally introduced into the cavities. These compounds are based on either cement or similar hydraulically setting substances, or anhydrous calcium sulfates or calcium sulfate hemihydrates, which solidify in the presence of water to give gypsum, $CaSO_4.2\ H_2O$. Although these products make it possible to fill the cavities with a material of relatively high compressive strength, the flow properties of the sludges make it very difficult completely to fill the uppermost regions of the cavities.

The patent literature describes various processes and possible methods for solving the existing problems. For example, German Patent No. 1,091,963 describes a process for filling empty cavities associated with the facing of mine workings—by pumping in an inflatable material which is inflated prior to hardening. However, no information is given as to which inflatable materials are to be used in particular. The use of gypsum is not mentioned.

German Laid-Open Application DOS No. 2,724,599 claims a process for the preparation of an inflatable material which is converted to the solid state, for filling empty cavities associated with the facing of mine workings, this material consisting of fly ash, lime, sand and aluminum powder. However, the use of aluminum powder results in the evolution of hydrogen gas as a propellant, so that there is always a danger of the formation of oxyhydrogen gas mixtures.

European Patent No. 94,331 states that mine tunnels can be sealed by means of light gypsum or light anhydrite, calcined gypsum or anhydrite being mixed with a stable aqueous foam which consists of a liquid foaming agent and water. However, such foaming processes have the disadvantage that the foam in the still non-solidified state can readily collapse and that homogeneous mixing of the foam and the gypsum slurry is difficult to achieve.

According to European Patent No. 26,905, a foamed gypsum can also be prepared by mixing calcium sulfate hemihydrate, $CaSO_4.0.5H_2O$, with special polyvinyl alcohols and boric acid and with polyurethane as a foam component. However, these foamed gypsums are only intended for the production of structural elements. As stated above, the use of organic components in mining gives rise to safety problems precisely with regard to fire hazard.

German Laid-Open Application DOS No. 1,571,575 describes the production of foamed gypsum castings. The gypsum component used here is alpha-hemihydrate, alpha-$CaSO_4.0.5\ H_2O$, which is foamed by means of carbon dioxide gas produced in situ by reacting calcium carbonate with sulfuric acid. According to the laid-open application, the dry density of the foamed end product must not exceed 0.6–1.0. It is possible to stir a retardant into the suspension of calcium alphahemihydrate in water. Apart from the fact that this process can only be used for the production of foamed gypsum castings, a serious disadvantage is the use of sulfuric acid, since this gives rise to considerable safety problems in mining, at least in underground mining. Hence, in the Federal Republic of Germany, it is extremely unlikely that sulfuric acid will be approved by the mines inspectorate for underground foaming.

Because of the stated disadvantages in the production of foamed filling material for mining, such as the danger of fire or even explosion, insufficient strength or inadequate closing of the cavities and the danger of corrosion by sulfuric acid, it is an object of the present invention to provide a process in which sufficiently strong, non-combustible and rapidly stiffening materials are used completely to fill even the last remaining cavities, and which furthermore is sufficiently safe for the miner. A process or material of this type is particularly desirable for the facing of tunnels and galleries. The cavities present between the facing and the tunnel wall, i.e. the rock, must be completely filled, in particular at the roof, in order to avoid loosening of the rock as a result of the rock thrust.

We have found that this object is achieved, according to the invention, if the abovementioned mixture is mixed with a bisulfate-containing aqueous solution or suspension of one or more metals before being introduced into the cavities to be filled. In order to regulate the setting rate, water-soluble phosphate in the form of phosphate salts or mono- or polyphosphoric acids may also be added to the bisulfate-containing aqueous solution before or during mixing with the gypsum slurry.

Volume expansion of the solidifying material results in complete filling of the cavities. This makes it possible to avoid loosening of the wall rock and hence accumulation of firedamp.

The process according to the invention is described in detail below.

A finely divided alpha-hemihydrate powder which has a very high bulk density is converted to a slurry using a little water. The bulk density of the alpha-hemihydrate should as far as possible be greater than 1.2 g/cm$^3$. Such alpha-hemihydrate grades can be prepared by continuous or batchwise autoclave processes, the products having a maximum bulk density of up to 1.6 g/cm$^3$ or slightly higher. Cheap waste gypsums, for example from the production of phosphoric acid or from stack gas desulfurization, are usually used as the starting material.

To avoid premature setting, a retardant is advantageously added to the slurry of alpha-hemihydrate and water. Suitable retardants are all substances known for this purpose in gypsum technology. Examples of conventional retardants are the fruit acids tartaric acid and citric acid, as well as succinic acid, sulfosuccinic acid and other di- and tricarboxylic acids. Other retardants are gluconates, for example sodium gluconate, and carboxycelluloses, for example methylcellulose. Colloidal protein substances, such as glue, are also known to have a retardant effect. Furthermore, directly synthesized products, such as Retardan ®, an Na or Ca salt of polycondensates of gamma-aminobutyric acid and formaldehyde, are available commercially and very suitable as retardants.

A metal salt which evolves $CO_2$ when an acid is added, e.g. calcium carbonate, is stirred into the aqueous slurry, as a foam former. Other carbonates, such as magnesium carbonate, strontium carbonate or barium carbonate or, for example, potassium carbonate, can also be used. The amount of the carbonate should be from 0.2 to about 2 kg of carbonate per 100 kg of alphahemihydrate. Larger or smaller amounts of carbonate can also be used; however, they give a correspondingly light or dense foamed gypsum.

The gypsum slurry prepared from alpha-hemihydrate must be foamed within a relatively short time and before it sets, i.e. advantageously within 3 hours and even more advantageously within 1 hour, foaming being effected by mixing the said slurry thoroughly and briefly with a bisulfate-containing aqueous solution or suspension. The bisulfate-containing solution can be prepared underground by dissolving a metal bisulfate in as little water as possible. However, aqueous bisulfate solutions prepared on the surface by a conventional chemical method can of course also be used. Very generally, all bisulfates of the main group and subgroup metals, including ammonium, can be employed. They are of the general formula $Me_n^{Z+}(SO_4)_m \cdot xH_2SO_4$, where $Me^{Z+}$ is a Z-valent metal cation, n and m are each an integer and obey the relationship $m = Z \cdot n/2$, and x is from 1 to about 5. The bisulfates of the alkali metals, in particular potassium bisulfate, have proven particularly suitable. For example, when reacted with $CaCO_3$ or with $CaSO_4$ salts, potassium bisulfate forms the sparingly soluble double salt syngenite, $K_2SO_4 \cdot CaSO_4 \cdot H_2O$, making leaching of alkali metal salt more difficult. Some or all of the potassium ions may be replaced with $NH_4+$. Similarly, glauberite, $Na_2SO_4 \cdot CaSO_4$, may be formed from sodium bisulfate and $CaCO_3$ or calcium sulfates. In order to keep the water content of the foamed gypsum very low, concentrated solutions are advantageously used. The concentration of the bisulfate-containing solution may extend as far as the saturation concentration. Foam stabilizers, for example surfactants or organic polymers may be mixed with the bisulfate-containing solution and the foamed gypsum.

In addition to the stated substances, further assistants can be added to the gypsum slurry. These are, for example, plasticizers which reduce the viscosity of the gypsum slurry. Particularly useful gypsum plasticizers are commercial melamine resins. These are polycondensates of melamine, formaldehyde and a sulfonate, usually in a molar ratio of from 1:6:3 to 1:2:1. The amount of gypsum plasticizer used is from 0.05 to 3, preferably from 0.3 to 1.5, % by weight, based on gypsum. Inert fillers, e.g. sand, ground rock, fly ash and the like, can also be added to the gypsum slurry. Anhydrite, $CaSO_4$, may also be admixed. In order to increase the tensile strength, fibrous substances may be incorporated.

The gypsum slurry can be mixed with the bisulfate-containing solution by a conventional method, for example using a static mixer or a high-speed mixing tool. The only important aspect is that the bisulfate-containing acidic solution is combined rapidly and homogeneously with the alpha-hemihydrate and the carbonate.

EXAMPLES

EXAMPLE 1

Use of potassium bisulfate as a foaming agent and an accelerating admix 25 kg of water were initially taken in a stirred vessel, and, as retardants, 25 g of tartaric acid and 25 g of sodium gluconate (calculated as 100%) were dissolved therein. 100 kg of alpha-hemihydrate, alpha-$CaSO_4 \cdot 0.5 H_2O$, were then poured into the stirred solution through a funnel in the course of 5 minutes, after which 0.74 g of calcium carbonate in the form of a finely divided powder having a mean particle diameter of 1.2 μm was added. 10 g of calcium hydroxide, $Ca(OH)_2$, were additionally stirred into the slurry in order to render the total suspension slightly alkaline. After a mixing time of about 15 minutes, the gypsum slurry was pumped into a cavity of appropriate size (about 80 l) in the course of 5 minutes via a hose and by means of a Mohno pump. Immediately before the end of the hose, the gypsum slurry was mixed with a solution of potassium bisulfate in water. The potassium bisulfate solution was prepared from 2.9 kg of potassium bisulfate, $KHSO_4$, and 3 kg of water at 80° C. This solution was metered into the gypsum slurry at a rate such that it was consumed in the same time as the said slurry. The initial and final portions of the gypsum slurry were discarded. A very rapidly solidifying porous gypsum material was obtained in the cavity.

The water/gypsum value was calculated as 0.28, based on the amount of water introduced with the gypsum slurry and the bisulfate solution.

After 7 days, right parallelepipeds measuring 6.25×4×4 cm were sawn from the solidified porous gypsum material, and the breaking load and breaking strength were determined according to DIN 1168. The mean values of these were 19 kN and 6.7 N/mm², respectively, for 8 parallelepipeds from the upper part, and 26.8 kN and 10.7 N/mm², respectively, likewise for 8 parallelepipeds sawn from the lower part of the gypsum material.

EXAMPLE 2

Use of a sodium bisulfate solution containing phosphoric acid

A slurry having the same composition as in Example 1 was prepared from alpha-hemihydrate under the same conditions. As described above, this slurry was used to fill a cavity of about 80 l in the course of 5 minutes, with thorough admixing of a solution of 1.97 kg of sodium bisulfate, $NaHSO_4$, 0.63 kg of 85% strength phosphoric acid and 4 kg of water. The bisulfate-containing solution was at 27° C. A less rapidly solidifying porous gypsum material was likewise obtained.

The calculated water value was 0.291.

EXAMPLES 3 TO 8

Table 1 reproduces Examples of foaming formulations with further bisulfate-containing solutions or suspensions. The procedure for the preparation of the gypsum slurry and its application are carried out as described in Example 1. To make it easier to compare the formulations with one another, they are each standardized to 100 kg of alpha-hemihydrate in the Table.

Unless indicated otherwise by the index, retardants 1 and 2 stated in the Table are 100% pure tartaric acid (retardant 1) and the sodium salt of gluconic acid (retardant 2, calculated as 100%), which was used in the form of a 50% strength aqueous solution (see Table 1). Similarly, unless stated to the contrary, the carbonate used was a finely powdered $CaCO_3$ already described in Example 1.

TABLE 1

| | Further Examples of bisulfate-containing foaming formulations | | | | | | |
|---|---|---|---|---|---|---|---|
| | Example no. | 3 | 4 | 5 | 6 | 7 | 8 |
| Gypsum slurry | alpha-$CaSO_4.0.5\ H_2O$ [kg] | 100 | 100 | 100 | 100 | 100 | 100 |
| | Water [kg] | 25 | 24 | 25 | 24 | 24 | 21.7 |
| | Retardant 1 [g] | 25 | 30 | 25 | 10[5] | 50 | — |
| | Retardant 2 [g] | 25 | 30 | 25 | — | 50 | — |
| | Carbonate [kg] | 0.74 | 0.9[3] | 0.5 | 0.6 | 0.6[3] | 0.3[9] |
| | Calcium hydroxide [g] | 100 | 100 | 150 | 100 | 100 | — |
| Bisulfate-containing liquid | Metal bisulfate [kg] | 0.98[1] | 0.9[2] | 1.3[4] | 0.86[6] | 1.12[7] | 0.5[8] |
| | Water [kg] | 3 | 4 | 5 | 6 | 6 | 4 |
| | Phosphoric acid (85%) [kg] | 0.95 | 1 | — | — | — | — |
| | or $NaH_2PO_4$ [kg] | — | — | 0.3 | — | — | — |

[1] $NaHSO_4$
[2] $NH_4HSO_4$
[3] $CaCO_3$ having a mean particle size of 0.2 mm
[4] $KHSO_4$
[5] Retardan F (Chemische Fabrik Grunau GmbH)
[6] $KHSO_4 + Al(HSO_4)_3$ in a molar ratio of 1:1
[7] $Fe(HSO_4)_2$
[8] $KH_3(SO_4)_2$
[9] $NaHCO_3$

We claim:

1. A process for filling empty cavities associated with the facing of mine workings which comprises the steps of:
   (a) preparing an aqueous slurry for introduction into said cavities which, in addition to water, consists essentially of alpha-hemihydrate, alpha-$CaSO_4.0.5$-$H_2O$ and a metal salt capable of evolving $CO_2$ when in contact with an acid with said salt being selected from the group consisting of alkaline and alkaline earth metal carbonates;
   (b) prior to being introduced into said cavities, admixing said slurry with an aqueous medium which contains a metal bisulfate foaming agent;
   (c) conveying the resulting foamable mixture into said cavities; and
   (d) allowing the mixture to foam and thereafter solidify to fill the cavities.

2. The process according to claim 1, wherein said foaming agent is potassium bisulfate.

3. The process according to claim 1, wherein said foaming agent is sodium bisulfate.

4. The process according to claim 1, wherein said metal bisulfate is present in said aqueous medium in the form of a solution.

5. The process according to claim 1, wherein said metal bisulfate is present in said aqueous medium in the form of a suspension.

6. The process according to claim 1, wherein a water-soluble phosphate selected from the group consisting of monophosphoric acid, polyphosphoric acid and the salts thereof is added to said bisulfate-containing aqueous medium which is admixed with said slurry.

7. The process according to claim 1, wherein at least one setting retardant for gypsum is added to the slurry containing alpha-hemihydrate.

* * * * *